United States Patent
Gu

(10) Patent No.: US 9,357,108 B2
(45) Date of Patent: May 31, 2016

(54) IMAGE SENSOR HAVING A NOISE FILTER, CAMERA HAVING THE IMAGE SENSOR, AND DRIVING METHOD THEREOF

(71) Applicant: LG INNOTEK CO., LTD., Seoul (KR)

(72) Inventor: Eun Hye Gu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/411,082

(22) PCT Filed: Apr. 10, 2013

(86) PCT No.: PCT/KR2013/003011
§ 371 (c)(1),
(2) Date: Dec. 23, 2014

(87) PCT Pub. No.: WO2014/003301
PCT Pub. Date: Jan. 3, 2014

(65) Prior Publication Data
US 2015/0319343 A1    Nov. 5, 2015

(30) Foreign Application Priority Data

Jun. 28, 2012  (KR) .......................10-2012-0070371

(51) Int. Cl.
| | |
|---|---|
| H04N 3/14 | (2006.01) |
| H04N 5/335 | (2011.01) |
| H04N 5/217 | (2011.01) |
| H04N 5/225 | (2006.01) |
| G09G 3/36 | (2006.01) |
| H04N 5/232 | (2006.01) |
| H04N 5/72 | (2006.01) |
| G02B 7/28 | (2006.01) |
| G02B 27/00 | (2006.01) |
| G06T 5/00 | (2006.01) |
| H04N 5/357 | (2011.01) |
| G06T 5/10 | (2006.01) |

(52) U.S. Cl.
CPC ............... *H04N 5/225* (2013.01); *G02B 7/282* (2013.01); *G02B 27/0056* (2013.01); *G06T 5/003* (2013.01); *G06T 5/10* (2013.01); *G09G 3/36* (2013.01); *H04N 5/2173* (2013.01); *H04N 5/23296* (2013.01); *H04N 5/3572* (2013.01); *H04N 5/72* (2013.01); *G06T 2207/20056* (2013.01)

(58) Field of Classification Search
CPC ..... H04N 5/357; H04N 5/225; H04N 5/3572; G06K 9/40
USPC .................................. 348/241, 300; 359/559
See application file for complete search history.

(56) References Cited

U.S. PATENT DOCUMENTS

| | | | |
|---|---|---|---|
| 5,140,463 A | 8/1992 | Yoo et al. ....................... 359/559 |
| 5,920,418 A * | 7/1999 | Shiono ....................... G01J 5/02 |
| | | | 348/E5.139 |

(Continued)

FOREIGN PATENT DOCUMENTS

| | | |
|---|---|---|
| JP | 2008-160405 A | 7/2008 |
| KR | 10-2007-0036773 A | 4/2007 |
| KR | 10-2010-0118772 A | 11/2010 |

OTHER PUBLICATIONS

Korean Office Action dated Jul. 26, 2013 issued in Application No. 10-2012-0070371.
International Search Report dated Aug. 24, 2013 issued in Application No. PCT/KR2013/003011 (full English text).

*Primary Examiner* — Kelly L Jerabek
(74) *Attorney, Agent, or Firm* — KED & Associates, LLP

(57) ABSTRACT

Disclosed are a camera, an image sensor thereof, and a driving method thereof. An image sensor converts an incident light into an electrical image signal. The image sensor outputs the converted electrical image signal by removing noise from the electrical image signal. An image processing unit processes the output image signal to generate screen image data. The image sensor effectively removes noise, thereby improving the optical precision of the camera.

12 Claims, 3 Drawing Sheets

(56) References Cited

U.S. PATENT DOCUMENTS

| | | | |
|---|---|---|---|
| 2002/0071612 A1* | 6/2002 | Pine | H04N 5/2176 382/260 |
| 2007/0146674 A1 | 6/2007 | Oskotsky et al. | 355/67 |
| 2009/0021619 A1 | 1/2009 | Kasuga et al. | 348/300 |
| 2009/0096915 A1* | 4/2009 | Kelly | H04N 5/23245 348/360 |
| 2009/0244329 A1 | 10/2009 | Kuniba | 348/241 |
| 2011/0122308 A1* | 5/2011 | Duparre | H01L 27/14621 348/340 |
| 2015/0234151 A1* | 8/2015 | Venkataraman | G02B 13/0015 348/360 |

* cited by examiner

IMAGE SENSOR HAVING A NOISE FILTER, CAMERA HAVING THE IMAGE SENSOR, AND DRIVING METHOD THEREOF

CROSS-REFERENCE TO RELATED PATENT APPLICATIONS

This application is a U.S. National Stage Application under 35 U.S.C. §371 of PCT Application No. PCT/KR2013/003011, filed Apr. 10, 2013, which claims priority to Korean Patent Application No. 10-2012-0070371, filed Jun. 28, 2012, whose entire disclosures are hereby incorporated by reference.

TECHNICAL FIELD

The disclosure relates to a camera and a driving method thereof. In particular, the disclosure relates to a camera, an image sensor thereof, and a driving method thereof.

BACKGROUND ART

In general, cameras have been changed toward high pixels of more than the current 8 megapixels from the past 0.3 megapixels. At the same time, the cameras have been added with various functions such as auto-focusing (AF) and optical-zoom functions. According to the above trends, the improvement in the precision of components of the cameras is required, and, especially, the improvement in the optical precision of the cameras has been strongly required.

DISCLOSURE OF INVENTION

Technical Problem

Accordingly, the object of the disclosure is to improve the optical precision of a camera.

Solution to Problem

In order to accomplish the above object, there is provided an image sensor including an image detecting unit for converting an incident light into an electrical image signal, and a noise filter for removing noise from the electrical image signal.

In this case, the image sensor may be assembled with a lens unit for receiving the incident light and including a diffractive optical element (DOE).

Further, in order to accomplish the above object, there is provided a camera including a lens unit for receiving incident light, an image sensor including a noise filter to output an electrical image signal converted from the incident light by removing noise from the electrical image signal, and an image processing unit for processing the output image signal to generate screen image data.

In this case, in the camera according to the embodiment, the lens unit may include a diffractive optical element.

Further, in order to accomplish the above object, there is provided an operating method of a camera, which includes converting an incident light into an electrical image signal by an image sensor, outputting the converted electrical image signal by removing noise from the electrical image signal by the image sensor, and processing the output image signal to generate screen image data by an image processing unit.

In this case, the operating method of the camera according to the embodiment may further include receiving the incident light by a lens unit including a diffractive optical element.

Advantageous Effects of Invention

As described above, the image sensor according to the disclosure not only can convert the light incident through the lens unit into electrical image signals, but also can remove noise from the electrical image signals. Therefore, even if noise is caused as a diffractive optical element is applied to the lens unit, the image sensor can effectively remove the noise. Therefore, the optical precision of the camera can be improved.

MODE FOR THE INVENTION

Figure 1:
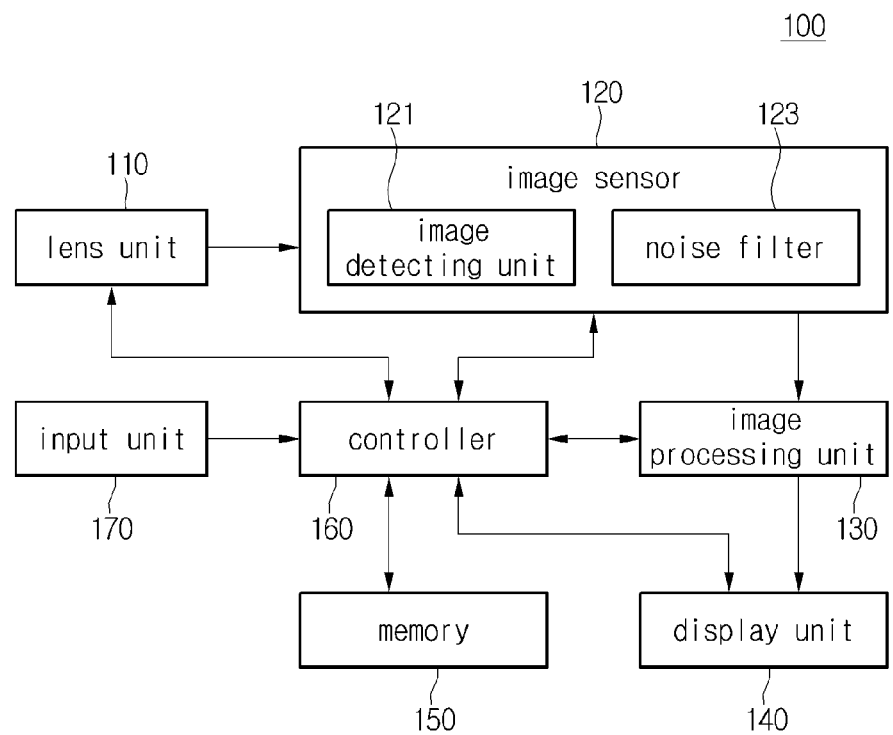
FIG. 1 is a block diagram showing the internal structure of a camera according to the embodiment.

Hereinafter, the embodiments will be more described in more detail with reference to accompanying drawings. The same components will be assigned with the same reference numerals in the accompanying drawings. In addition, the details of the structures and the functions generally known to those skilled in the art, which make the subject matter of the embodiments unclear, will be omitted in order to avoid redundancy.

Figure 2:
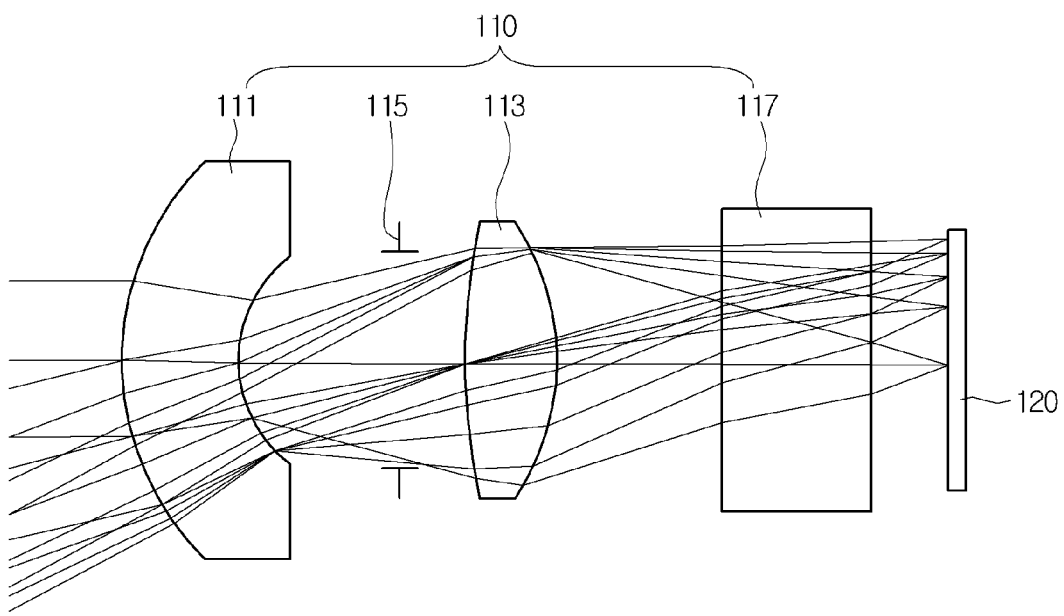
FIG. 2 is a view to explain the detailed structure of a lens unit of FIG. 1.
Figure 3:
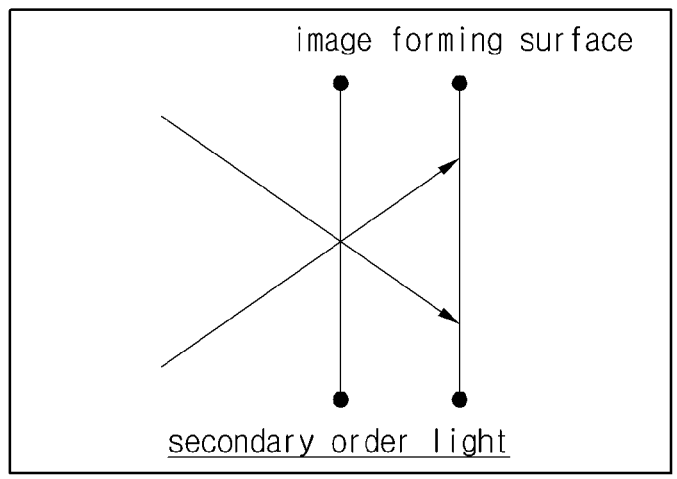
FIG. 3 is a view to explain the generation of the spill lights by the lens unit of FIG. 1.
Figure 3:
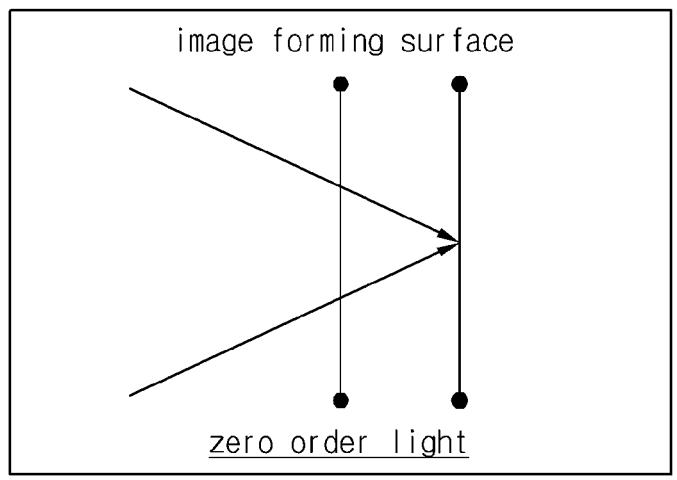
Figure 4:
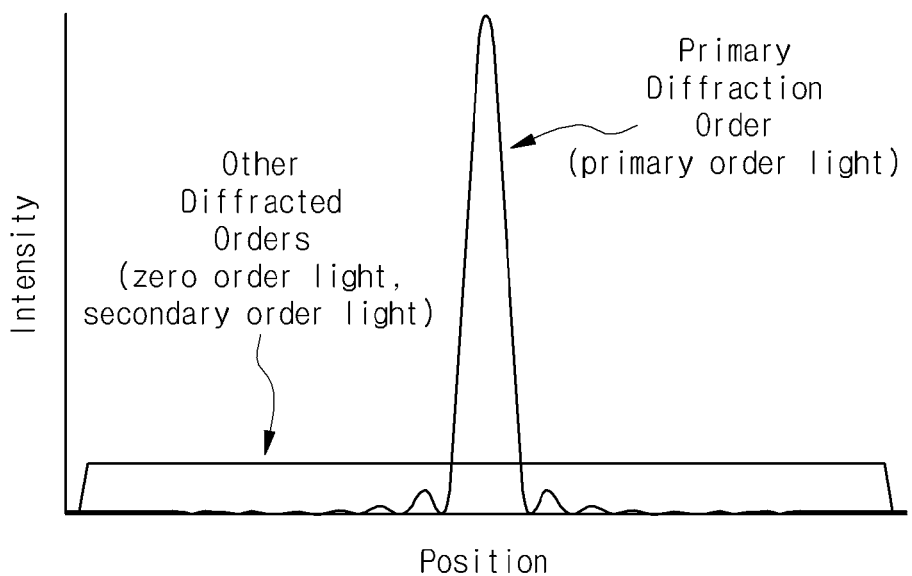
FIG. 4 is a view to explain the generation of the noise due to the spill lights of FIG. 1.
Figure 5:
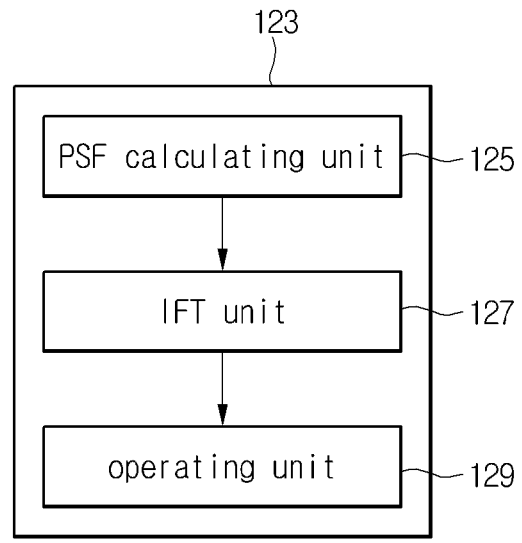
FIG. 5 is a block diagram showing the detailed structure of a noise filter in an image sensor according to the embodiment.

FIG. 1 is a block diagram showing the internal structure of a camera according to the embodiment, and FIG. 2 is a view to explain the detailed structure of a lens unit of FIG. 1. FIG. 3 is a view to explain the generation of the spill lights by the lens unit of FIG. 1, FIG. 4 is a view to explain the generation of the noise due to the spill lights of FIG. 1, and FIG. 5 is a block diagram showing the detailed structure of a noise filter in an image sensor according to the embodiment.

Referring to FIG. 1, a camera 100 according to the embodiment includes a lens unit 110, an image sensor 120, an image processing unit 130, a display unit 140, a memory 150, a controller 160, and an input unit 170.

The lens unit 110 receives incident light therein. In this case, the lens unit 110 allows the light to converge or diverge. In addition, the lens unit 110 allows the light to converge on an image sensor 120 to form an image. In other words, the lens unit 110 forms an optical image of a subject on the image sensor 120. In this case, the lens unit 110 includes diffractive optical elements (DOE). In other words, the lens unit 110 forms an image on the image sensor 120 through the diffraction phenomenon. In this case, the distance between the lens unit 110 and an image forming surface of the image sensor 120 to form an image is defined as a focal length. In addition, the lens unit 110 may include a focus lens (not shown) movable to an optical axis in order to adjust the focal length.

As shown in FIG. 2, the lens unit 110 includes a first lens group 111, a second lens group 113, an aperture 115, and an optical low pass filter (OLPF) 117. In this case, the first lens group 111, the second lens group 113, the aperture 115, and the optical filter 117 are arranged in parallel to the image sensor 120.

The first lens group 111 is realized as a concave lens having at least one surface to which the DOE is applied. In other words, the first lens group 111 has negative diffractive power. Additionally, in the first lens group 111, at least one surface includes an aspheric surface, and at least one opposite surface has the DOE applied thereto.

The second lens group 113 is realized as a convex lens having at least one surface to which the DOE is applied. In other words, the second lens group 113 has positive diffractive power. Additionally, in the second lens group 113, at least one surface includes an aspheric surface, and at least one opposite surface has the DOE applied thereto.

The aperture 115 adjusts the quantity of light. In this case, the aperture 115 may be interposed between the first and second lens groups 111 and 113.

The optical filter 117 passes a low frequency band. The optical filter 117 cuts off a high frequency band exceeding a Nyquist frequency. In this case, the optical filter 117 is interposed between the second lens group 113 and the image sensor 120.

In this case, as light is diffracted from the DOE of the lens unit 110, noise is caused. In detail, as shown in FIG. 3, primary order light is focused on the image forming surface of the image sensor 120 as shown in FIG. 3, so that the image is formed on the image sensor 120. However, as well as the primary order light, spill light such as zero order light or secondary order light is focused on the image sensor 120. In this case, the spill light makes the image of the image sensor 120 unclear. In other words, as shown in FIG. 4, the zero order light or the secondary order light is caused as noise around the primary order light on the image sensor 120. In this case, as the intensity of the primary order light is increased, even the intensity of the zero order light or the secondary order light is increased.

The image sensor 120 acquires an image formed through the lens unit 110. In other words, the image sensor 120 acquires the optical image of the subject. In this case, the image sensor 120 may include a complementary metal-oxide semiconductor (CMOS) or a charge coupled device (CCD). The image sensor 120 includes an image detecting unit 121 and a noise filter 123. In this case, the image detecting unit 121 and the noise filter 123 are realized in one body.

The image detecting unit 121 converts the light, which is incident through the lens unit 110, into an electrical image signal. In this case, the image detecting unit 121 has a structure in which a plurality of photo-detectors are integrated with each other while serving as pixels. In addition, the image detecting unit 121 includes a color filter. In this case, the color filter may include a color filter array (CFA). The CFA expresses one color from one pixel.

The noise filter 123 removes noise from the electrical image signal. In this case, the noise filter 123 removes the noise from the electrical image signal through a bilinear interpolation scheme.

As shown in FIG. 5, the noise filter 123 includes a PSF calculating unit 125, an inverse Fourier transform (IFT) unit 127, and an operating unit 129. In the following description, the image signal input to the noise filter 123 is referred to as a low-resolution image signal, and the image signal output from the noise filter 123 is referred to as a high-resolution image signal.

The PSF calculating unit 125 calculates a point spread function (PSF) from the low-resolution image signal. In other words, the PSF calculating unit 125 defines an additional function by using the low-resolution image signal as expressed in Math Figure 1. In addition, the PSF calculating unit 125 calculates a PSF(H) from the additional function as expressed in Math Figure 3. In this case, the PSF calculating unit 125 may calculate the PSF(H) by neglecting a noise component and applying a direct inverse. The PSF calculating unit 125 calculates a PSF(P) by using the PSF(H) as expressed in Math Figure 4.

Math Figure 1

$$M(f)=\|g-Hf\|^2+\alpha\|Cf\|^2 \qquad \text{[Math. 1]}$$

In Math Figure 1, M refers to an additional function. In addition, g refers to the high-resolution image signal obtained through the bilinear interpolation scheme, and is defined as expressed in Math Figure 2. Further, f refers to the high-resolution image signal to be output from the noise filter 123, and H refers to a PSF defining the relationship between g and f. In addition, $\|.\|$ refers to the standardization, and $\alpha$ refers to a normalization parameter. Further, C refers to a 2-D high frequency filter to attenuate the low-resolution image signal. Besides, the first term at the right side of Math Figure 1 refers to the reliability of the high-resolution image signal obtained through the bilinear interpolation scheme, and the second term refers to the attenuation of the high-resolution image signal to be output from the noise filter 123.

Math Figure 2

$$g=Bz=Hf+n \qquad \text{[Math. 2]}$$

In Math Figure 2, z represents the low-resolution image signal, and n represents a noise component caused by H.

MathFigure 3

$$H(k, l) = \frac{G(k, l)}{F(k, l)} \qquad \text{[Math. 3]}$$

In Math Figure 3, $H(k,l)$ refers to a $(k,l)^{th}$ component of the PSF(H) on the frequency domain, and $G(k,l)$ refers to a $(k,l)^{th}$ component of the high-resolution image signal obtained through the bilinear interpolation scheme on the frequency domain. In addition, $F(k,l)$ refers to a $(k,l)^{th}$ component of the high-resolution image signal to be output from the nose filter 123 on the frequency domain.

MathFigure 4

$$P(k, l) = \frac{H^*(k, l)}{H^*(k, l)H(k, l) + C^*(k, l)C(k, l)} \qquad \text{[Math. 4]}$$

In Math Figure 4, P(k, l) refers to a (k, l) component of the PSF(P) on the frequency domain. In addition, * refers to a complex-conjugate operator.

The IFT unit 127 calculates an inverse PSF. In other words, the IFT unit 127 performs an inverse Fourier transform with respect to the PSF(P).

The operating unit 129 performs the convolution operation with respect to the low-resolution image signal and the inverse PSF convolution operation, thereby removing noise from the low-resolution image signal. In other words, the operating unit 129 calculates f by using both of the inverse PSF and the Math Figure 2 as expressed in Math Figure 5.

Accordingly, the operating unit 129 acquires and outputs the high-resolution image signal to be output in the noise filter 123.

Math Figure 5

$$f=Pg=PBz=Qz \qquad \text{[Math. 5]}$$

The image processing unit 130 processes the image signal from the image sensor 120 to generate screen image data. In this case, the image processing unit 130 processes the image signal in the unit of a frame. In addition, the image processing unit 130 outputs the image data suitable for the characteristic and the size of the display unit 140. In this case, the image processing unit 130 may include an image signal processor (ISP) or an application processor (AP).

The display unit 140 displays the screen image data output from the image processing unit 130. In addition, the display unit 140 displays user data output from the controller 160. The display unit 140 may be realized by using a liquid crystal display (LCD). If the display unit 140 is realized through a touch screen scheme, the liquid crystal display device may serve as an input unit.

The memory 150 may include a program memory and a data memory. The program memory stores programs to control the general operation of the camera 100. The data memory stores data produced during the executing of the programs. In this case, the data memory may store screen image data or user data.

The controller 160 controls the overall operation of the camera 100. In other words, the controller 160 controls the lens unit 110 and the image sensor (120) so that images are photographed. In this case, the controller 160 forms an image on the image sensor 120 through the lens unit 110, and acquires the image through the image sensor 120. In addition, the controller 160 controls the image processing unit 120 to generate screen image data. Further, the controller 160 controls the display unit 140 to display the screen image data. In this case, the controller 160 may store the screen image data in the memory 150.

The input unit 170 includes keys to request the execution of various functions. In this case, the input unit 170 may include a storage key used to request the storage of the screen image data.

Figure 6:
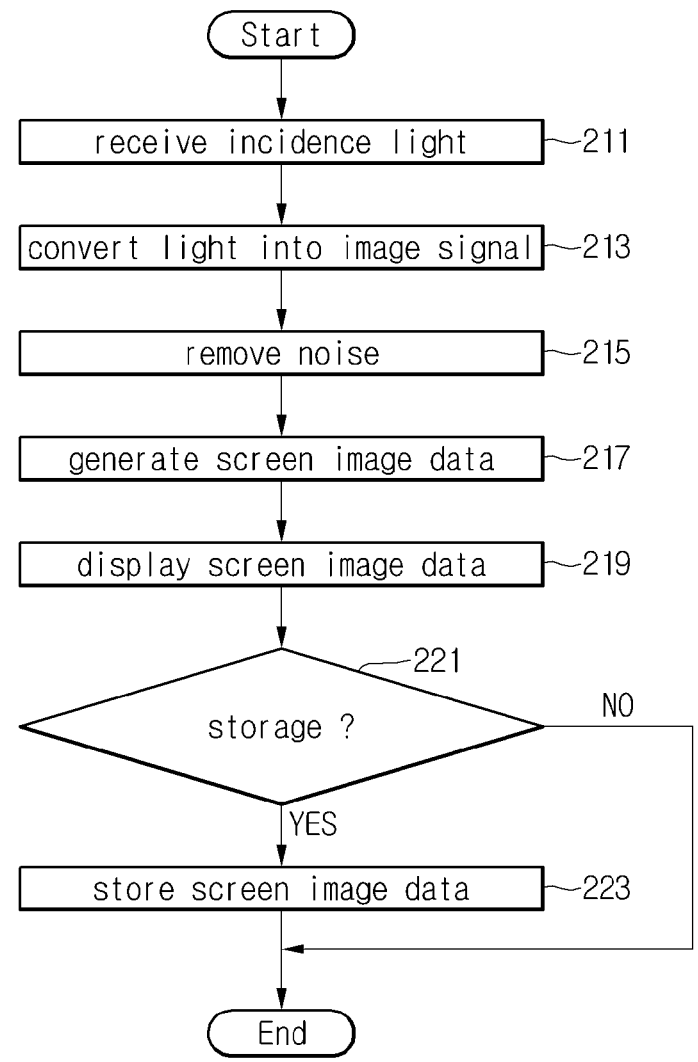
FIG. 6 is a flowchart showing the operation of the camera according to one embodiment.

FIG. 6 is a flowchart showing the operation of a camera according to the embodiment.

Referring to FIG. 6, the operation of the camera 100 according to the present embodiment is started from step 211 in which the lens unit 110 receives light incident therein. The lens unit 110 allows the light to converge or diverge. In addition, the lens unit 110 allows the light to converge on an image sensor 120 to form an image. In other words, the lens unit 110 forms an optical image of the subject on the image sensor 120.

Thereafter, the image sensor 120 converts the light incident from the lens unit 110 into an electrical image signal in step 213. In addition, the image sensor 120 removes noise from the electrical image signal in step 215. The noise filter 123 of the image sensor 120 removes noise from the electrical image signal through the bilinear interpolation scheme.

In this case, in the noise filter 123, the PSF calculating unit 125 calculates the PSF from the low-resolution image signal. In other words, the PSF calculating unit 125 defines an addition function by using the low-resolution image signal as expressed in Math Figure 1. In addition, the PSF calculating unit 125 calculates a PSF(H) from the addition function as expressed in Math Figure 3. In this case, the PSF calculating unit 125 may calculate the PSF(H) by neglecting the noise component and applying the direct inverse. In addition, the PSF calculating unit 125 calculates the PSF(P) by using the PSF(H) as expressed in Math Figure 4.

Next, in the noise filter 123, the IFT unit 127 calculates an inverse PSF. In other words, the IFT unit 127 performs an inverse Fourier transform with respect to the PSF(P). Thereafter, in the noise filter 123, the operating unit 129 performs a convolution operation with respect to the low-resolution image signal and the inverse PSF, thereby removing noise from the low-resolution image signal. In other words, the operating unit 129 calculates f by using both of the inverse PSF and the Math Figure 2 as expressed in Math Figure 5. Accordingly, the operating unit 129 acquires and outputs the high-resolution image signal to be output in the noise filter 123.

Subsequently, the image processing unit 130 processes the image signal from the image sensor 120 in step 217 to generate image data. In this case, the image processing unit 130 processes the image signal in the unit of a frame. In addition, the image processing unit 130 outputs the image data suitable for the characteristic and the size of the display unit 140.

Finally, the display unit 140 displays screen image data output from the image processing unit 130 in step 219. In this case, the controller 160 determines the storage of the screen image data in step S221. Thereafter, if the screen image data are determined as being stored as a result of step 221, the controller 160 stores the screen image data in the memory 150 in step 223. Meanwhile, if the screen image data are determined as not being stored as the result of step 221, the controller 160 does not store the screen image data. In addition, the controller 160 terminates the operation procedure of the camera 100.

In other words, in power-on, the camera 100 may repeat the operation procedure thereof. In this case, the camera 100 performs step 211 to 219 to display a preview screen image. In addition, the camera 100 may selectively perform steps 221 and step 223 to capture the preview screen image. In other words, the camera 100 may store the preview screen image which is currently displayed. Accordingly, the camera 100 may store still images or a moving picture.

According to the disclosure, the image sensor 120 not only converts the light incident into the lens unit 110 into an electrical image signal, but also removes noise from the electrical image signal. Accordingly, as the DOE is applied to the lens unit 110, even if the noise is caused, the image sensor 120 can effectively remove noise. Accordingly, the optical precision of the camera 100 can be improved.

Meanwhile, the embodiments of the disclosure disclosed in the subject specification and the accompanying drawings are just exemplary and do not limit the present disclosure. In other words, those skilled in the art to which the present invention pertains will know that various modifications and applications which have not been exemplified may be carried out within a range which does not deviate from the essential characteristics of the embodiments.

The invention claimed is:

1. An image sensor comprising:
   an image detecting unit for converting an incident light into an electrical image signal, wherein the image detecting unit includes a photodetector array; and
   a noise filter for removing noise from the electrical image signal,
   wherein the image sensor is assembled with a lens unit for receiving the incident light and including a diffractive optical element (DOE), wherein the lens unit includes at least one of a first lens group, a second lens group, an aperture, and an optical low pass filter, wherein the noise is caused as the light is diffracted in the diffractive optical element, and wherein the noise filter includes:
- a point spread function (PSF) calculating unit for calculating a PSF from the electrical image signal;
- an inverse Fourier transform unit for calculating an inverse PSF by performing an inverse Fourier transform with respect to the PSF; and
- an operating unit for removing the noise from the electrical image signal by performing a convolution operation with respect to the electrical image signal and the inverse PSF.

2. The image sensor of claim 1, wherein the noise filter removes the noise from the electrical image signal by using a bilinear interpolation scheme.

3. The image sensor of claim 1, wherein the image detecting unit includes a color filter array.

4. The image sensor of claim 3, wherein the color filter array expresses one color from one pixel.

5. The image sensor of claim 1, wherein the PSF calculating unit calculates a PSF from a low-resolution image signal which is an image signal input to the noise filter.

6. A camera comprising:
- a lens unit for receiving incident light;
- an image sensor including a noise filter to output an electrical image signal converted from the incident light by removing noise from the electrical image signal; and
- an image processing unit for processing the output image signal to generate screen image data, wherein the lens unit includes a diffractive optical element, wherein the noise is caused as the incident light is diffracted in the diffractive optical element, wherein the noise filter includes:
- a point spread function (PSF) calculating unit for calculating a PSF from the converted electrical image signal;
- an inverse Fourier transform unit for calculating an inverse PSF by performing an inverse Fourier transform with respect to the PSF; and
- an operating unit for removing the noise from the converted electrical image signal by performing a convolution operation with respect to the electrical image signal and the inverse PSF.

7. The camera of claim 6, wherein the image sensor further includes an image detecting unit for converting the incident light into the electrical image signal, wherein the image detecting unit includes a photodetector array.

8. The camera of claim 7, wherein the image detecting unit includes a color filter array.

9. The camera of claim 8, wherein the color filter array expresses one color from one pixel.

10. The camera of claim 6, wherein the PSF calculating unit calculates a PSF from a low-resolution image signal which is an image signal input to the noise filter.

11. An operating method of a camera, the operating method comprising:
- converting an incident light into an electrical image signal by an image sensor;
- outputting the converted electrical image signal by removing noise from the electrical image signal by the image sensor; and
- processing the output image signal to generate screen image data by an image processing unit, further comprising receiving the incident light by a lens unit comprising a diffractive optical element, wherein the noise is caused as the light is diffracted in the diffractive optical element, wherein the outputting of the electrical image signal includes:
- calculating a PSF from the converted electrical image signal;
- calculating an inverse PSF by performing an inverse Fourier transform with respect to the PSF; and
- removing the noise from the converted electrical image signal by performing a convolution operation with respect to the converted electrical image signal and the inverse PSF.

12. The operating method of claim 11, wherein the converting of the electrical image signal is performed by an image detecting unit of the image sensor, and the outputting of the electrical image signal is performed by a noise filter of the image sensor, wherein the image detecting unit includes a photodetector array.

* * * * *